US007981539B2

(12) United States Patent
Lai

(10) Patent No.: US 7,981,539 B2
(45) Date of Patent: Jul. 19, 2011

(54) BATTERY CONNECTOR INCLUDING A HOUSING, A PLURALITY OF ELECTRIC TERMINALS, AND A STOPPING ELEMENT

(75) Inventor: Ming-Chun Lai, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 1107 days.

(21) Appl. No.: 11/797,669

(22) Filed: May 7, 2007

(65) Prior Publication Data

US 2008/0280196 A1 Nov. 13, 2008

(51) Int. Cl.

| | |
|---|---|
| ***H01M 6/42*** | (2006.01) |
| ***H01M 2/24*** | (2006.01) |
| ***H01R 24/00*** | (2006.01) |
| ***H01R 33/00*** | (2006.01) |
| ***H01R 4/48*** | (2006.01) |
| ***H01R 4/50*** | (2006.01) |
| ***H01R 13/62*** | (2006.01) |

(52) U.S. Cl. ........ 429/159; 429/158; 429/160; 439/627; 439/862; 439/863; 439/366

(58) Field of Classification Search .......... 429/149–160, 429/121; 439/203–204, 366, 368, 371–372, 439/374, 382, 504, 521–522, 626–630, 754, 759–761, 772–774, 862–863, 500

See application file for complete search history.

(56) References Cited

U.S. PATENT DOCUMENTS 6,529,714 B1 * 3/2003 Nakamura et al. ......... 455/575.1

* cited by examiner

*Primary Examiner* — Dah-Wei D Yuan
*Assistant Examiner* — Claire L Roe
(74) *Attorney, Agent, or Firm* — Cheng-Ju Chiang

(57) ABSTRACT

A battery connector includes a housing having a bottom wall, two sides of the bottom wall extend upward to form two sidewalls, and the back end of the bottom wall extends upward to form a back wall. At least one partition wall is set between the two sidewalls and connects with the bottom wall and the back wall. A plurality of terminal recesses are defined in the housing and separated by the partition wall for receiving a plurality of electric terminals. Each electric terminal has a soldering portion extending forward to connect with a printed circuit board and a contacting portion protruding upward out of the housing for contacting a battery. Between the housing and the printed circuit board a stopping element is set. The stopping element can stop the contacting portion moving forward to contact the printed circuit board or lose resilience if improper installation of the battery occurs.

5 Claims, 4 Drawing Sheets

BATTERY CONNECTOR INCLUDING A HOUSING, A PLURALITY OF ELECTRIC TERMINALS, AND A STOPPING ELEMENT

BACKGROUND OF THE INVENTION

1. Field of the Invention

The present invention relates to a battery connector, and more particularly to a battery connector used in a portable electronic device for connecting a battery with the portable electronic device.

2. The Related Art

A battery connector used in a mobile phone or other portable electronic device conventionally comprises a housing having a plurality of terminal recesses and a plurality of electric terminals received therein. The electric terminal comprises a soldering portion, a connecting portion and a contacting portion.

However, when the battery is installed into the battery connector inappropriately, the contacting portion of the electric terminal may contact the printed circuit board, therefore causing circuitry shortage if the deformation of the electric terminal is too large. In some other cases, the electric terminal is easily losing consistent resilience and even breaks down if improper installation of the battery occurs.

SUMMARY OF THE INVENTION

An object of the present invention is to provide a battery connector overcoming the foregoing shortcoming. The battery connector includes a housing, a plurality of electric terminals and a stopping element. The housing has a bottom wall, two sidewalls extending upward on the two sides of the bottom wall, a back wall extending upward on the back end of the bottom wall and at least one partition wall mounted between the two sidewalls. The partition wall is connected with the bottom wall and the back wall and separates the space between the two sidewalls to form a plurality of terminal recesses in the housing. The electric terminals received in corresponding terminal recesses each has a base portion. One end of the base portion extends forward to form a soldering portion for contacting the printed circuit board, and the other end of the base portion bends upward to form a connecting portion. The free end of the connecting portion extends forward and upward and then bends downward to form a contacting portion protruding upward out of the housing for contacting a battery. The stopping element is set at the front of the housing and located at the front of the contacting portion of the electric terminal for stopping the electric terminal moving forward.

When the battery and the battery connector are in assembly, the battery will force the contacting portion of the electric terminal and then the contacting portion moves forward against the stopping element and being stopped moving thereby, so setting the stopping element can avoid the contacting portion contacting the printed circuit board or losing resilience if improper installation of the battery occurs.

DETAILED DESCRIPTION OF THE PREFERRED EMBODIMENT

Figure 1:
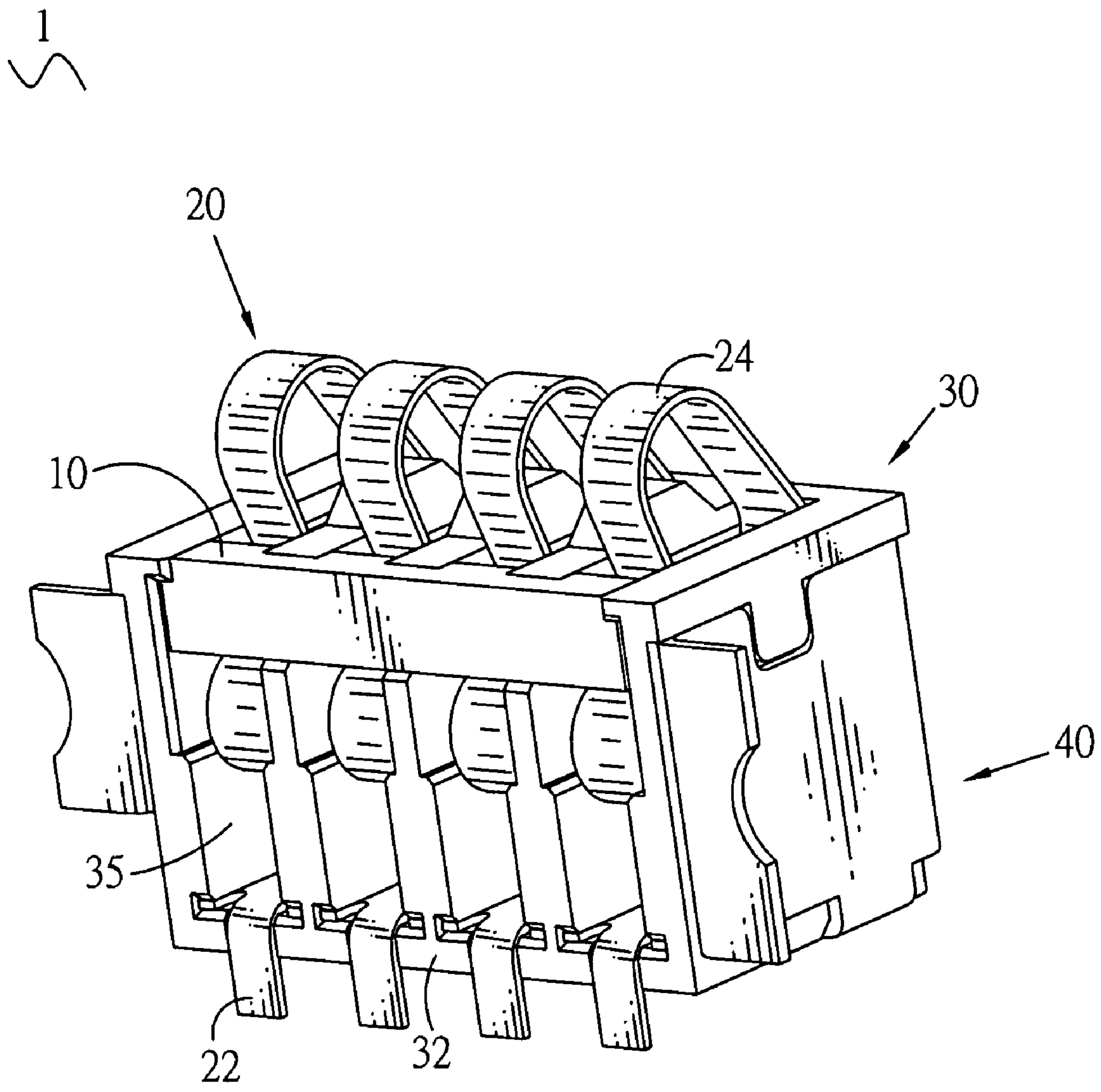
FIG. 1 is a perspective view of a battery connector according to the present invention.
Figure 2:
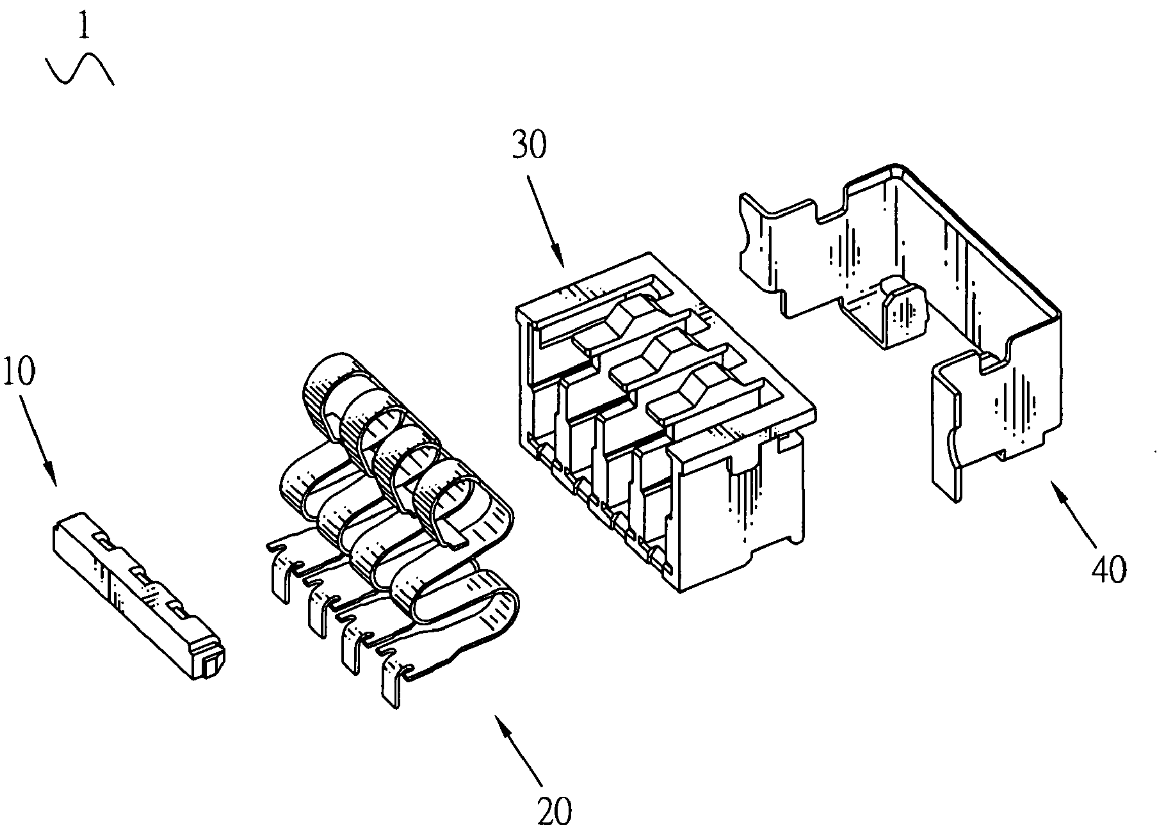
FIG. 2 is an exploded view of the battery connector.

With reference to FIG. 1 and FIG. 2, a battery connector 1 of the present invention includes a stopping element 10, a housing 30, a plurality of electric terminals 20 received in the housing 30, and a shell 40 covering on the surface of the housing 30 for protecting the housing 30. The stopping element 10 is fixed at the side that the housing 30 faces to a printed circuit board (not shown).

Figure 3:
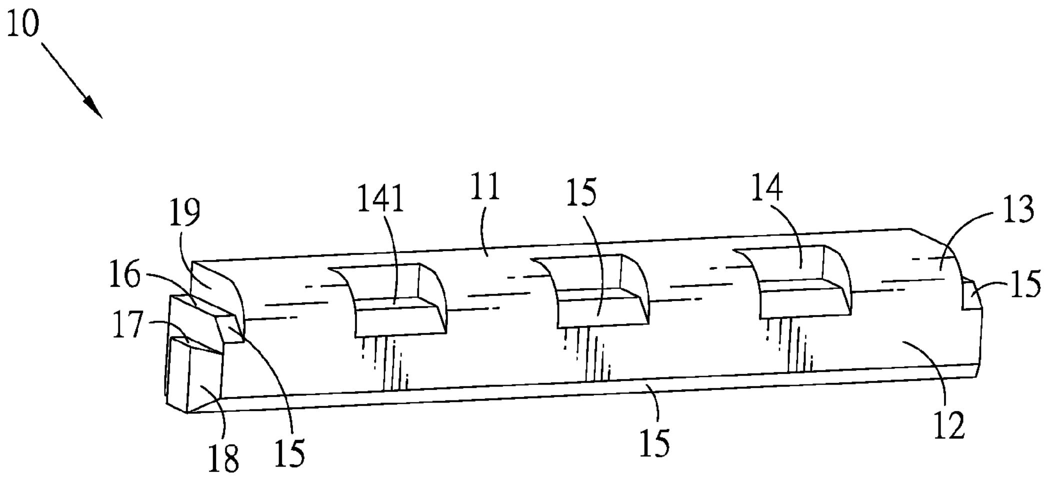
FIG. 3 is a perspective view of a stopping element of the battery connector.

Referring to FIG. 3, the cuboid stopping element 10 includes a top surface 11, a back surface 12 and two side surfaces 19. The top surface 11 communicates with the back surface 12 by an arc surface 13 defining a plurality of the first openings 14. The first openings 14 defined equidistantly on the arc surface 13 have a bottom surface 141 at the bottom of the first opening 14. The back end of the bottom surface 141 slants downward to form a first leading surface 15 between the bottom surface 141 and the back surface 12 of the stopping element 10. The undersides of the side surfaces 19 protrude outward to form a protuberance 16 and the back end of the top surface of the protuberance 16 also slants downward to form a first leading surface 15. The underside of the protuberance 16 continues to protrude outward to form a wedge 17. The back end of the outside surface of the wedge 17 slants inward to joint the back surface 12 of the stopping element 10, therefore a second leading surface 18 is formed between the outside surface of the wedge 17 and the back surface 12 of the stopping element 10. The bottom of the back surface 12 also forms a first leading surface 15.

Figure 4:
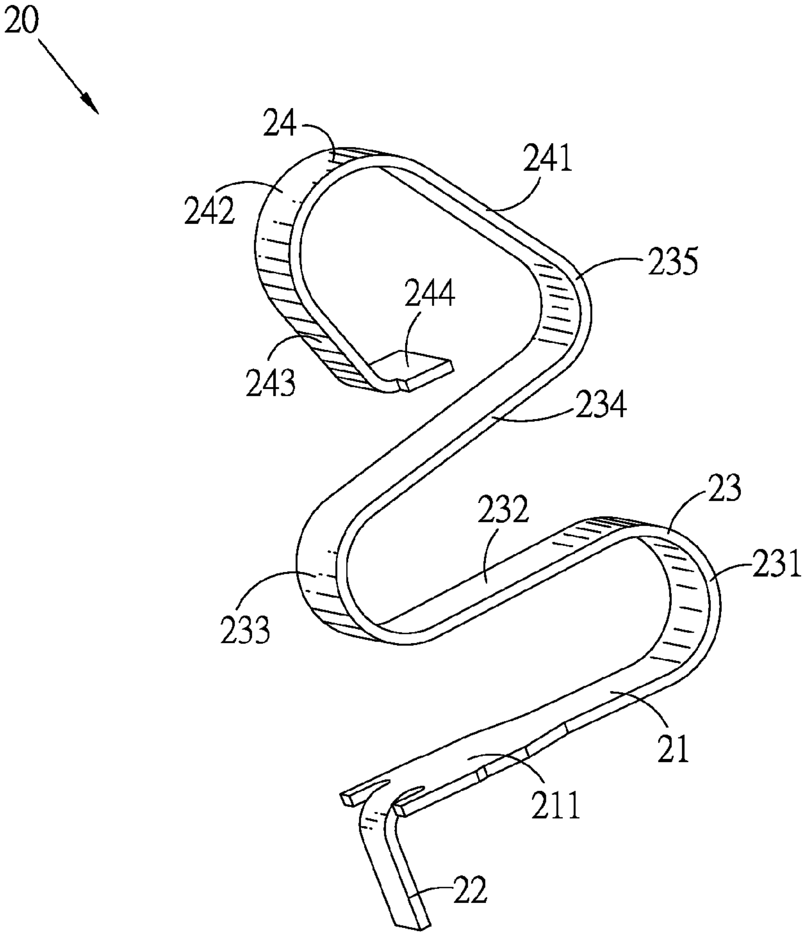
FIG. 4 is a perspective view of an electric terminal of the battery connector.

Referring to FIG. 4, the electric terminal 20 includes a base portion 21, a connecting portion 23, a soldering portion 22 connecting with the printed circuit board, and a contacting portion 24 contacting a battery (not shown). The end of the base portion 21 extends forward to form a fixing portion 211, and the fixing portion 211 bends downward to form the soldering portion 22. The connecting portion 23 has a first arc 231, a first connecting arm 232, a second arc 233, a second connecting arm 234 and a third arc 235. The other end of the base portion 21 bends upward to form the first arc 231, and the first arc 231 extends forward to form the first connecting arm 232, and the free end of the first connecting arm 232 bends upward to form the second arc 233, and the second arc 233 extends backward to form the second connecting arm 234. The free end of the second connecting arm 234 bends upward to form the third arc 235 whose free end connecting with a first resilient arm 241 of the contacting portion 24. The free end of the resilient arm 241 extends upward and then bends downward to form a contacting surface 242. The contacting surface 242 keeps extending downward to form a second resilient arm 243. The free end of the second resilient arm 243 bends backward to form a stopping portion 244.

Figure 5:
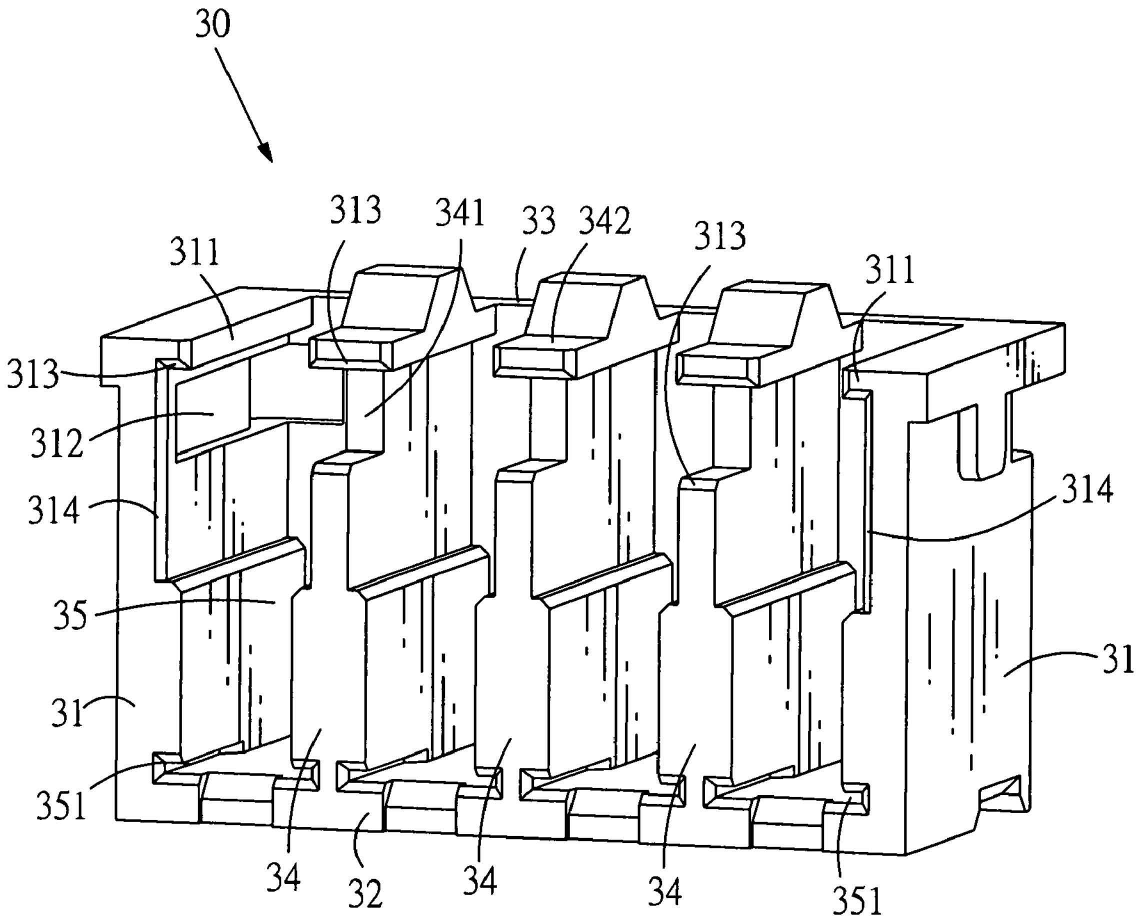
FIG. 5 is a perspective view of a housing of the battery connector.

Referring to FIG. 5, the housing 30 has a bottom wall 32, two opposite sidewalls 31, a back wall 33 and at least one partition wall 34. The bottom wall 32 extends upward to form the two sidewalls 31 on the two opposite sides, and the back end of the bottom wall 32 extends upward to form the back wall 33. The partition wall 34 is mounted between the two sidewalls 31 and connected with the bottom wall 32 and the back wall 33 for separating the space between the two sidewalls 31 to form a plurality of terminal recesses 35 in the housing 30. The bottom of each terminal recess 35 defines an inlay slot 351 at the foreside. The top of the two opposite sidewalls 31 extend vis-a-vis to form a blocking walls 311 respectively. The bottom surface of the blocking wall 311 connects with the front surface of the blocking wall 311 by a third leading surface 313. A fourth leading surface 314 is formed between the inside surface of the two sidewall 31 and the front surface of the two sidewall 31. The inside surface of the two sidewall 31 defines a wedge recess 312 near the blocking wall 311. The front end of the partition wall 34 defines a second opening 341 near the top of the partition wall 34, as a result, a projection 342 is formed at the top of the second opening 341. The top surface of the second opening 341 and the bottom surface of the second opening 341 communicate with the front surface of the partition wall 34 by the third leading surface 313 respectively.

Refer ring to FIG. 1 and FIGS. 3-5, in assembly, the electric terminals 20 are received stably in the terminal recesses 35 by the fixing portion 211 fixing in the inlay slot 351, and the soldering portion 22 of the electric terminal 20 extends out of the front of the housing 30 for soldering with the printed circuit board, and the contacting portion 24 of the electric terminal 20 protrudes upward out of the housing 30 for contacting the battery. The stopping element 10 inserts into the second opening 341 by the leading of the first leading surface 15 cooperating with the corresponding third leading surface 313 of the housing 30, and then the projection 342 inserts into the first opening 14 of the stopping element 10, at the some time, the wedge 17 of the stopping element 10 fixes in the wedge recess 312 of the housing 30 by the leading of the second leading surface 18 cooperating with the corresponding fourth leading surface 314 of the housing 30, so the stopping element 10 fixes firmly in the housing 30 and contacts tightly the inside surface of the sidewall 31 and the bottom surface of the blocking wall 311. Lastly, the shell 40 covers on the sidewalls 31 and the back wall 33.

When the battery contacts the battery connector 1, the contacting surface 242 is pushed by the battery and brings the contacting portion 24 to move forward the stopping element 10 until the second resilient arm 243 contacts the arc surface 13 of the stopping element 10. So setting the stopping element 10 can avoid that the contacting portion 24 contacts the printed circuit board or loses resilience if improper installation of the battery occurs.

What is claimed is:

1. A battery connector comprising:

a housing having a bottom wall, two sidewalls extending upward from two sides of the bottom wall, a back wall extending upward from a back end of the bottom wall, and at least one partition wall mounted between the two sidewalls, the partition wall connected with the bottom wall and the back wall and separating a space between the two sidewalls to form a plurality of terminal recesses in the housing;

a plurality of electric terminals received in the corresponding terminal recesses respectively and each having a base portion, one end of the base portion extending forward to form a soldering portion for contacting a printed circuit board, and the other end of the base portion bending upward to form a connecting portion, a free end of the connecting portion extending forward and upward and then bending downward to form a contacting portion protruding upward out of the housing for contacting a battery; and a stopping element set at a front of the housing and located at a front of the contacting portion of the each electric terminal for stopping the each electric terminal from moving forward, wherein the stopping element has a top surface defining a plurality of first openings, a back surface and two side surfaces, lower portions of the two side surfaces respectively protrude outward to form protuberances, tops of the two sidewalls of the housing extend vis-a-vis to form blocking walls respectively, a front of the partition wall defines a second opening near a top of the partition wall, a projection is formed at a top of the second opening, the stopping element is fixed firmly in the second opening, the projection is inserted into the first opening, and the protuberances of the stopping element tightly contact inner surfaces of the sidewalls and bottom surfaces of the blocking walls;

wherein each of the first openings of the stopping element has a bottom surface, a back end of the bottom surface of the each first opening slants downward to form a first leading surface between the bottom surface of the each first opening and the back surface of the stopping element, a back end of a top surface of each protuberance slants downward to form another first leading surface, a bottom of the back surface of the stopping element further forms another first leading surface, a third leading surface is formed between the bottom surface and a front surface of each of the blocking walls, and another third leading surface is formed between a bottom surface of the second opening and a front surface of the partition wall, the stopping element is inserted into the housing by cooperative leading of the first leading surfaces and the corresponding third leading surfaces.

2. The battery connector as claimed in claim 1, wherein a lower portion of an outer surface of the each protuberance protrudes to form a wedge, a second leading surface slants inward from a back end of an outside surface of the wedge to the back surface of the stopping element, the inner surface of the sidewall defines a wedge recess near the blocking wall, a fourth leading surface is formed between the inner surface and a front surface of the sidewall, the wedge is inserted into the wedge recess by cooperative leading of the second leading surface and the corresponding fourth leading surface.

3. The battery connector as claimed in claim 1, wherein the top surface of the stopping element connects with the back surface of the stopping element by an arc surface defining the plurality of the first openings.

4. The battery connector as claimed in claim 1, wherein the connecting portion includes a first arc formed by the base portion bending upward, the first arc extends forward to form a first connecting arm, a free end of the first connecting arm bends upward to form a second arc, and the second arc extends backward to form a second connecting arm, a free end of the second connecting arm bends upward to form a third arc whose free end connects with a first resilient arm of the contacting portion, a free end of the first resilient arm extends upward and then bends downward to form a contacting surface, the contacting surface extends downward to form a second resilient arm, a free end of the second resilient arm bends backward to form a stopping portion.

5. A battery connector comprising:

a housing having a bottom wall, two sidewalls extending upward from two sides of the bottom wall, a back wall extending upward from a back end of the bottom wall, and at least one partition wall mounted between the two sidewalls, the partition wall connected with the bottom wall and the back wall and separating a space between the two sidewalls to form a plurality of terminal recesses in the housing;

a plurality of electric terminals received in the corresponding terminal recesses respectively and each having a base portion, one end of the base portion extending forward to form a soldering portion for contacting a printed circuit board, and the other end of the base portion bending upward to form a connecting portion, a free end of the connecting portion extending forward and upward and then bending downward to form a contacting portion protruding upward out of the housing for contacting a battery; and a stopping element set at a front of the housing and located at a front of the contacting portion of the each electric terminal for stopping the each electric terminal from moving forward, wherein the stopping element has a top surface defining a plurality of first openings, a back surface and two side surfaces, lower portions of the two side surfaces respectively protrude outward to form protuberances, tops of the two sidewalls of the housing extend vis-a-vis to form blocking walls respectively, a front of the partition wall defines a second opening near a top of the partition wall, a projection is formed at a top of the second opening, the stopping element is fixed firmly in the second opening, the projection is inserted into the first opening, and the protuberances of the stopping element tightly contact inner surfaces of the sidewalls and bottom surfaces of the blocking walls;

wherein a lower portion of an outer surface of each of the protuberances protrudes to form a wedge, a second leading surface slants inward from a back end of an outside surface of the wedge to the back surface of the stopping element, the inner surface of the sidewall defines a wedge recess near the blocking wall, a fourth leading surface is formed between the inner surface and a front surface of the sidewall, the wedge is inserted into the wedge recess by cooperative leading of the second leading surface and the corresponding fourth leading surface.

* * * * *